United States Patent [19]

Friesen et al.

[11] Patent Number: 4,873,393
[45] Date of Patent: Oct. 10, 1989

[54] LOCAL AREA NETWORK CABLING ARRANGEMENT

[75] Inventors: Harold W. Friesen; Wendell G. Nutt, both of Dunwoody, Ga.

[73] Assignee: American Telephone and Telegraph Company, AT&T Bell Laboratories, Murray Hill, N.J.

[21] Appl. No.: 170,500

[22] Filed: Mar. 21, 1988

[51] Int. Cl.$^4$ ............................................ H01B 11/04
[52] U.S. Cl. ......................................... 174/34; 174/36
[58] Field of Search .................................. 174/34, 36

[56] References Cited

U.S. PATENT DOCUMENTS

| | | | |
|---|---|---|---|
| 3,209,064 | 9/1965 | Cutler | 174/36 |
| 3,271,508 | 9/1966 | Burr | 174/34 |
| 3,546,357 | 12/1970 | Mac Pherson | 174/34 |
| 3,882,907 | 5/1975 | Degen | 174/34 X |
| 3,894,172 | 7/1975 | Jachimowicz et al. | 174/34 |
| 4,058,669 | 11/1977 | Nutt et al. | 174/34 |
| 4,262,164 | 4/1981 | Nutt et al. | 174/34 |
| 4,401,845 | 8/1983 | Odhner et al. | 174/110 FC |
| 4,412,094 | 10/1983 | Dougherty et al. | 174/34 X |
| 4,697,051 | 9/1987 | Beggs et al. | 174/36 X |

FOREIGN PATENT DOCUMENTS 835188 5/1960 United Kingdom .................. 174/34

OTHER PUBLICATIONS

*Electronic Wire and Cable*, p. 32, an AT&T catalog dated Jan. 1988.

*Primary Examiner*—Morris H. Nimmo
*Attorney, Agent, or Firm*—Edward W. Somers

[57] ABSTRACT

A cable (20) which is particularly suited to the transmission of substantially error-free data at relatively high rates over relatively long distances includes at least two pairs of individually insulated conductors (42—42). The pairs of individually insulated conductors are enclosed in a tubular member (51) comprising a plastic material. A metallic shield (54) may or may not enclose the tubular member, and in a preferred embodiment, a plastic jacket (58) is provided. The twist length of each pair of insulated conductors does not exceed a value equal to the product of about forty and the outer diameter of the plastic insulation. Further, the twist lengths among the conductor pairs are varied in accordance with a twist frequency scheme modulated by non-uniform increments of twist frequency.

11 Claims, 4 Drawing Sheets

LOCAL AREA NETWORK CABLING ARRANGEMENT

TECHNICAL FIELD

This invention relates to a local area network cabling arrangement. More particularly, it relates to a spatially efficient, readily installable cable which is capable of providing substantially error-free data transmission at relatively high bit rates over relatively long distances.

BACKGROUND OF THE INVENTION

Along with the greatly increased use of computers for offices and for manufacturing facilities, there has developed a need for a cable which may be used to connect peripheral equipment to mainframe computers and to connect two or more computers into a common network. Of course, the sought-after cable desirably should provide substantially error-free transmission at relatively high rates.

A number of factors must be considered to arrive at a cable design which is readily marketable for such uses. The jacket of the sought-after cable should exhibit low friction to enhance the pulling of the cable into ducts or over supports. Also, the cable should be strong, flexible and crush-resistant, and it should be conveniently packaged and not unduly weighty. Because the cable may be used in occupied building spaces, flame retardance also is important.

The sought-after data transmission cable should be low in cost. It must be capable of being installed economically and be efficient in terms of space required. It is not uncommon for installation costs of cables in buildings, which are used for interconnection, to outweigh the cable material costs. Building cables should have a relatively small cross-section inasmuch as small cables not only enhance installation but are easier to conceal, require less space in ducts and troughs and wiring closets and reduce the size of associated connector hardware.

Also important to cost is whether or not the system is arranged to provide transmission in what is called a balanced mode, In balanced mode transmission, voltages and currents on the conductors of a pair are equal in amplitude but opposite in polarity. This requires the use of additional components, such as transformers, for example, at end points of the cable between the cable and logic devices, thereby increasing the cost of the system. Oftentimes, computer equipment manufacturers have preferred the use of systems characterized by an unbalanced mode to avoid investing in additional components for each line. In an unbalanced mode transmission system, voltages and currents on the conductors of a pair are not characterized by equality of amplitude and opposition of polarity. Computer equipment manufacturers have adopted unbalanced mode transmission and are not prone to retrofit their equipment in order to simplify the interconnection of peripherals. At the same time, however, peripheral connection arrangements must meet predetermined attenuation and crosstalk requirements.

To satisfy present, as well as future needs, the sought-after cable should be capable of suitable high frequency data transmission. This requires a tractable loss for the distance to be covered, and crosstalk and electromagnetic interference (EMI) performance that will permit substantially error-free transmission. Also, the cable must not contaminate the environment with electromagnetic interference.

Of importance to the design of local area network copper conductor cables are the speed and the distances over which data signals must be transmitted. In the past, this need has been one for interconnections operating at data speeds up to 20 kilobits per second and over a distance not exceeding about 150 feet. This need has been satisfied in the prior art with single jacket cable which may comprise a plurality of insulated conductors that are connected directly between a computer, for example, and receiving means such as peripheral equipment.

In today's world, however, it becomes necessary to transmit data signals at much higher speeds over distances which may include several hundreds of feet. Currently, equipment is commercially available that can transmit 10 Mbps data signals for 300 or 400 feet. Even at these greatly increased distances, the transmission must be substantially error-free and at relatively high rates. Further advances in data rate/distance capability are becoming increasingly difficult because of crosstalk between the pairs of commerically available cables.

Often, this need has been filled with coaxial cable comprising the well-known center solid and outer tubular conductor separated by a dielectric material. The use of coaxial cables, which inherently provide unbalanced transmission, presents several problems. Coaxial connectors are expensive and difficult to install and connect, and, unless they are well designed, installed and maintained, can be the cause of electromagnetic interference. Of course, the use of coaxial cables does not require components such as transformers at each end to provide balanced mode transmission, but the size and connectorization of coaxial cables outweigh this advantage.

Faced with this situation, customers, local area network (LAN) vendors and distribution system vendors began exploring alternatives for making LAN wiring more affordable and manageable while still providing the necessary level of transmission performance. Overlooked by most investigators has been the unshielded twisted pair long used for premises distribution of telephone signals.

The unshielded twisted pair has always been used for telephone transmission in the balanced (differential) mode. Used in this manner, the unshielded twisted pair has excellent immunity to interference whether from the outside (EMI) or from signals on other pairs (crosstalk). Over the past several years, in fact, some LAN designers, have come to realize the latent transmission capability of unshielded twisted pair wire. Especially noteworthy is the twisted pair's capability to transmit rugged quantized digital signals as compared to corruptible analog signals.

The limitations imposed by crosstalk, especially near-end crosstalk, on the data rate/distance capabilities of twisted pair cables are generally recognized. Hereinafter, near-end cross talk is referred to as crosstalk. Often overlooked as a means of reducing crosstalk between twisted pairs is the pair twist scheme. For instance, one recent specification required simply that each pair be twisted with a twist length less than six inches. The most common treatment for crosstalk is to add shielding over each twisted pair to confine its electric and magnetic fields. However, as the electric and magnetic fields are confined, resistance, capacitance and inductance all change, each in such a way as to increase transmission loss. For instance, it is not unusual to find designs of shielded pairs whose attenuation is three times that of similar unshielded pairs. One company markets a cable in which each pair of conductors is provided with a shield and a braid is provided about the plurality of pairs. In order to compensate for the increased losses, the conductor insulation must be increased in thickness. As a result, the insulated conductors are bulky, expensive and cannot be terminated with conventional connector hardware.

Cable connectorability is very important and is more readily accomplished with twisted insulated conductor pairs than with any other medium. A widely used connector for insulated conductors is one which is referred to as a split beam connector. Desirably, the outer diameter of insulated conductors of the sought-after cable is sufficiently small so that the conductors can be terminated with such existing connector systems.

The sought after cabling arrangement should be one that may be used to replace the well known D-inside wiring which comprises a plurality of twisted insulated conductor pairs. The pairs are non-shielded and are enclosed in a jacket. Improved pair isolation has long been sought in such wiring to reduce crosstalk.

Seemingly, the solutions of the prior art to the problem of providing a local area network cabling arrangement which can be used to transmit, for example, data bits error-free at relatively high rates over relatively long distances have not yet been totally satisfying. What is needed and what is not provided by the prior art is a cable which is inexpensively made and which has crosstalk levels which are an order of magnitude lower than those experienced with D-inside wiring or with other economically available products. Further, any arrangement proposed as a solution to the problem should be one which does not occupy an undue amount of space and one which facilitates a simplistic connection arrangement. There is a need to provide cables that can transmit data rates of many megabits per second, error-free, from stations to closets or between computer cabinets separated by comparable distances to main rooms, be readily installed, fit easily into building architectures, and be safe and durable.

SUMMARY OF THE INVENTION

The foregoing problems have been overcome by a cabling arrangement of this invention which is capable of high rate transmission of data streams at a relatively low level of crosstalk. A cabling media which is suitable for data transmission with relatively low crosstalk includes a first pair of metallic conductors, the pair including two plastic insulated metallic conductors which are twisted together. The media also includes at least one other pair of metallic conductors each pair including two plastic insulated metallic conductors which are twisted together and being in relatively close proximity to the first pair such as being an adjacent pair in a cabling trough. The characterization of the twisting is important and relates to parameters such as twist length or, alternatively, twist frequency which hereinafter is expressed in terms of the number of twists per foot of length. For example, a one inch twist length equates to a twist frequency of twelve twists per foot. Conductors of each pair are twisted together in accordance with a twist frequency spacing between adjacent pair twists and such that the twist length does not exceed the product of about forty and the diameter of one of the insulated conductors of the pair. Also, the twist frequency spacing is modulated with a degree of randomization.

In another embodiment of this invention, which is preferred, a cable comprises a plurality of transmission media each of which includes a twisted pair of individually insulated conductors with each of the insulated conductors including a metallic conductor and an insulation cover which encloses the metallic conductor. The twisting together of the conductors of each pair is characterized as set out hereinbefore and the plurality of transmission media are enclosed in a sheath system which in a most simplistic embodiment may be a single jacket made of a plastic material. The cable of the preferred embodiment includes a sheath system which may or may not include a shield that protects the cable against electromagnetic interference. The shield may be a laminate which comprises a metallic material and a plastic film and encloses the plurality of transmission media which are used for data transmission.

As a result of the physical separation of the conductor pairs and the maintenance of the twist configuration of each pair, crosstalk performance is improved. Also, the cable of this invention is relatively easy to connect and is relatively easy to manufacture and install.

Not only does the twist length arrangement provide improved crosstalk performance, but also it reduces the number of color patterns required for identification of the conductors in the field. Because of the relatively short twist lengths, the twist in each conductor pair remains intact in the end portions of the cables after the sheath system along the end portions has been removed.

BRIEF DESCRIPTION OF THE DRAWING

Other features of the present invention will be more readily understood from the following detailed description of specific embodiments thereof when read in conjunction with the accompanying drawings, in which:

FIG. 11 is a plan view in schematic of a trough in which are disposed three twisted pairs having different twist frequencies.

DETAILED DESCRIPTION

Figures 1, 6:
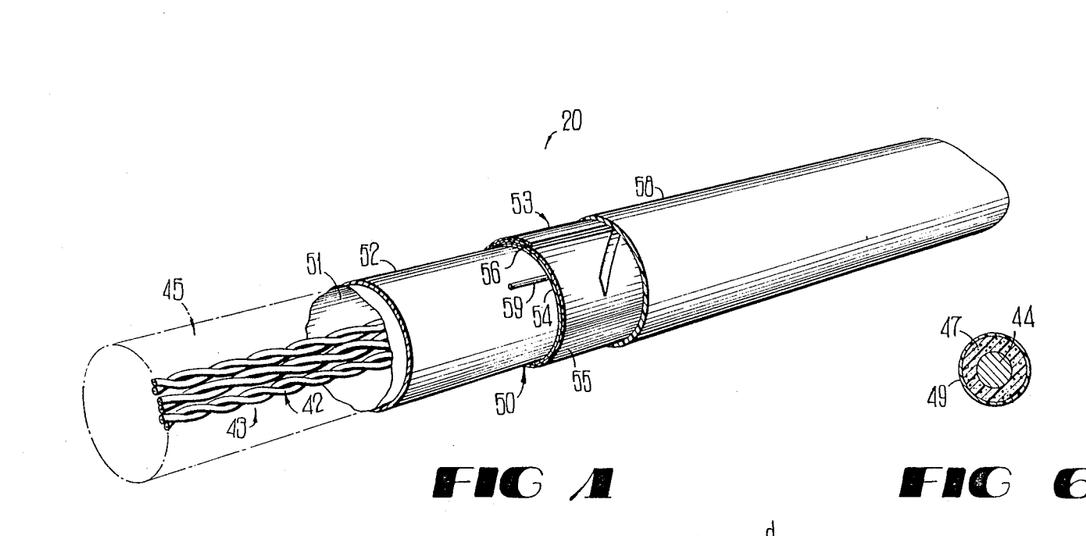
FIG. 1 is a perspective view of a cable of this invention for providing substantially error-free data transmission over relatively long distances.
FIG. 6 is an end view in section of a metallic conductor having dual layers of insulation.
Figure 2:
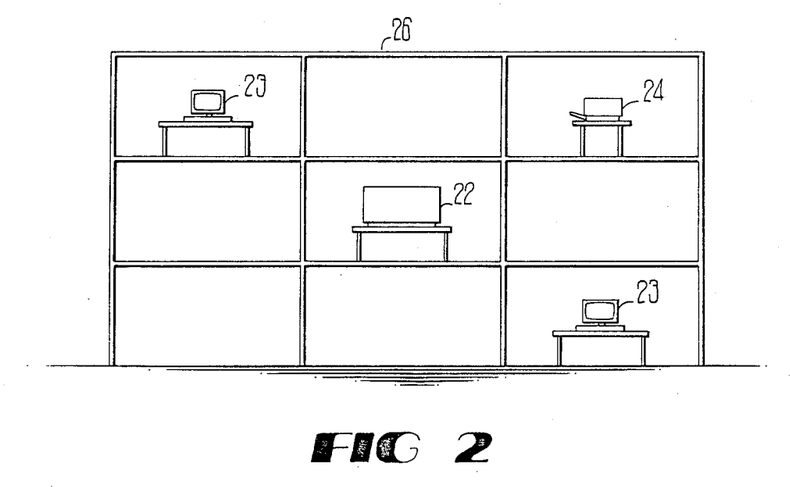
FIG. 2 is an elevational view of a building to show a mainframe computer and printers linked by the cable of this invention.

Referring now to FIG. 1, there is shown a data transmission cable which is designated generally by the numeral 20. Typically, the cable 20 may be used to network one or more mainframe computers 22—22, many personal computers 23—23, and peripheral equipment 24 on the same or different floors of a building 26 (see FIG. 2). The peripheral equipment 24 may include a high speed printer, for example. Desirably, the interconnection system minimizes interference on the system in order to provide substantially error-free transmission.

Figure 3:
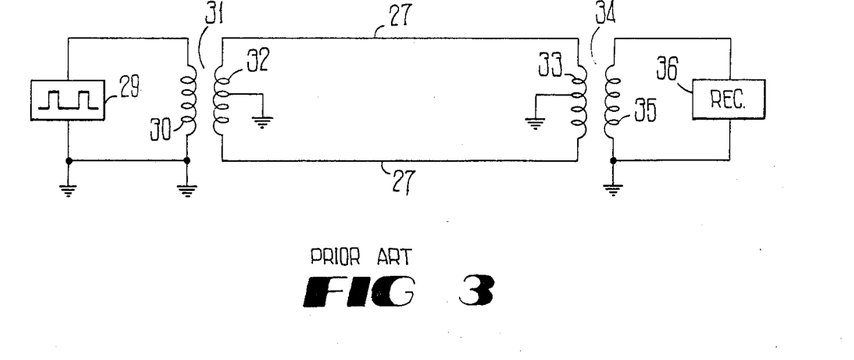
FIG. 3 is a schematic view of a pair of insulated conductors in a prior art arrangement for balanced mode transmission.

The cable 20 of this invention is directed to providing substantially error-free data transmission in a balanced mode. A balanced mode prior art transmission system which includes a plurality of pairs of individually insulated conductors 27—27 is shown in FIG. 3. Each pair of conductors 27—27 is connected from a digital signal source 29 through a primary winding 30 of a transformer 31 to a secondary winding 32 which is center-tap grounded. The conductors are connected to a winding 33 of a transformer 34 at the receiving end which is also center-tap grounded. A winding 35 of the transformer 34 is connected to a receiver 36. With regard to outside interference, whether it be from power induction or other radiated fields, the electric currents cancel out at the output end. If, for example, the system should experience an electromagnetic interference spike, both conductors will be affected equally, resulting in a null, with no change in the received signal. For unbalanced transmission, a shield may minimize these currents but cannot cancel them.

Computer equipment manufacturers frequently have not found it advisable to use balanced mode transmission, primarily because of costs. For unbalanced mode transmission, it is unnecessary to connect additional components such as transformers into circuit boards at the ends of each conductor pair. Use in an unbalanced mode avoids the need for additional terminus equipment and renders the cable compatible with present equipment. However, because of the distances over which the cable of this invention is capable of transmitting data signals substantially error-free at relatively high rates, there may be a willingness to invest in the additional components at the ends of the cable which are required for balanced mode transmission.

Further, there is a requirement that the outer diameter of the cable 20 not exceed a predetermined value and that the flexibility of the cable be such that it can be installed easily. The cable 20 has a relatively small outer diameter and is both rugged and flexible thereby overcoming the many problems encountered when using a cable with individually shielded pairs. Typically, the cable 20 includes between two and twenty-five pairs of insulated conductors and its outer diameter is in the range of about 0.05 inch to 1.0 inch.

Figures 4, 4A:
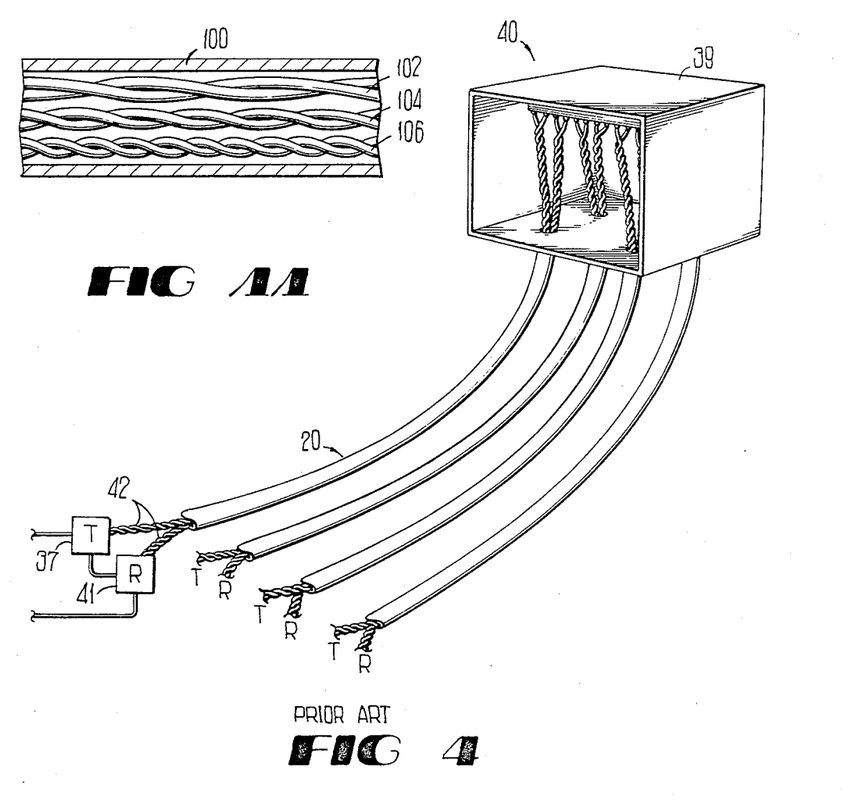
FIG. 4 is a schematic view of a data transmission system.

Referring now to FIG. 4, there is shown an example system 40 in which the cable 20 of this invention is useful. In FIG. 4, a transmitting device 37 at one station is connected along a pair of conductors 42—42 of one cable to an interconnect hub 39 and then back out along another cable to a receiving device 41 at another station. A plurality of the stations comprising transmitting devices 37—37 and receiving devices 41—41 are connected to the interconnect hub 39 and then back out along another cable to a receiving device 41 at another station. A plurality of the stations comprising transmitting devices 37—37 and receiving devices 41—41 may be connected to the interconnect hub in what is referred to as a ring network. As can be seen in this example, the conductors are routed from the transmitting device at one terminal to the hub 39 and out to the receiving device at another terminal, thereby doubling the transmission distance.

More particularly, the cable 20 of this invention includes a core 45 comprising a plurality of twisted pairs 43—43 of the individually insulated conductors 42—42 (see FIGS. 1 and 5) which are used for data transmission. Each of the conductors 42—42 includes a metallic portion 44 (see FIG. 5) and an insulation cover 46. In a preferred embodiment which is shown in FIG. 6, the insulation cover comprises an inner layer 47 of cellular material such as for example, expanded polyethylene and an outer skin layer 49 of a solid plastic material such as a polyvinyl chloride composition. In a preferred embodiment, the metallic conductor is 24 gauge copper, the thickness of the inner layer is about 0.005 inch and that of the outer layer is about 0.003 inch.

In a preferred embodiment, the core 45 is enclosed in a sheath system 50 (see again FIG. 1). The sheath system may include a core wrap 51 and an inner jacket 52 which comprises a material having a relatively low dielectric constant. In a preferred embodiment, the inner jacket 52 is a plastic material, and more particularly, a polyvinyl chloride (PVC) material. Further, the thickness of the inner jacket is equal to the product of about 0.167 to 1.0 times the outer diameter (DOD) of an insulated conductor 42. For example, a typical DOD may be 0.036, in which event the jacket thickness is 0.006.

The inner jacket 52 is enclosed in a laminate 53 (see FIG. 1) comprising a metallic shield 54 and a plastic film 55 and having a longitudinally extending overlapped seam 56. The laminate is arranged so that the plastic film faces outwardly. In a preferred embodiment, the thickness of the metallic shield 54, which typically is made of aluminum, is 0.001 inch whereas the thickness of the film is 0.002 inch. A drain wire 59, which may be a stranded or a solid wire, is disposed between the shield 54 and the inner jacket 52. The metallic shield 54 is enclosed in an outer jacket 58 which comprises a plastic material such as polyvinyl chloride, for example. In a preferred embodiment, the thickness of the outer jacket 58 is about 0.020 inch.

In a more simplistic arrangement, the plurality of pairs of insulated conductors are enclosed in a single plastic jacket. Of course, the plurality of pairs may be disposed side by side in a wiring trough and not be enclosed in a plastic jacket.

Also, the materials for the conductor insulation and the jacket or jackets are such as to render the cable flame and smoke retardant. For example, those materials may be fluoropolymers.

The pairs of insulated conductors 42—42 are adjacent to one another in a cable or in a wiring trough, for example. Therein, the pairs are in close proximity to one another and protection against crosstalk must be provided.

The characterization of the twisting of the conductors of each pair is important for the cable of this invention to provide substantially error-free transmission at relatively higher rates. Pair twists and pair separation, which is the distance between conductor pairs, are the principal parameters to be controlled. Accordingly, it becomes necessary to measure pair separation and twist separation. Customarily, pair twists have been specified by twist lengths of conductor pairs and twist separation by the difference in twist lengths. Twist lengths may be characterized as varying between 2 inches up to 5 inches in 0.1 inch steps. As a result, the percent difference in successive twist lengths at the low end of the scale is about 55 whereas that at the upper end of the scale is about 2%. Thus, long twist lengths are spaced closely.

It has been found that pair twists advantageously are specified by their twist frequency and twist separation by the difference in twist frequency. Twist frequency (TF) has the dimension (length)$^{-1}$ whereas the dimension of twist length (TL) is, of course, length. A twist length of 2 inches equates to a twist frequency of 0.5 twist per inch. and the 5 inch twist length equates to 0.2 twist per inch. For substantially error-free, high speed data transmission, the conductor pairs that are in close physical proximity should be well separated in twist characteristic as measured by the twist frequency of each pair. That is, adjacent like pair twists may result in unacceptable crosstalk.

In a twist frequency cabling arrangement, the twists are selected to obtain twist frequencies which decrease in steps of 0.1 twist per inch. As a result, the percent difference in twist frequencies at the lower end of the twist length or higher end of the twist frequency is (0.5−0.49)/0.5 or 2% whereas at the lower value end of the twist frequency, the percent difference is about 5.0%. Thus, conductor pairs having high twist frequencies are spaced closely. This results in improved crosstalk performance.

Within a limited range of pair twists, twist frequency more accurately measures twist separation than does the customarily used parameter, twist length. As disclosed in U.S. Pat. No. 4,058,669 which issued on Nov. 15, 1977 in the names of W. G. Nutt and G. H. Webster, frequency spacing provides a crowding or close spacing of the high twist frequencies but, advantageously, wide spacing of the low twist frequencies.

In the above-identified Nutt, et al. patent, the twist frequency spacing may be based, for example, upon a precession length scheme of from 20 to 51 twists per 90 inches of cable length. The range of 20-51 twists is selected to obtain the desired number of discernibly different twists, and yet have practical shortest and longest twists. A further feature is that differences in twist frequency have been randomized for pairs that are proximate. That is, the twist arrangement is such that the increments of the twist frequency spacing are non-uniform. For example, pairs 1, 2, and 3 have twist frequencies of 50, 40, and 29 respectively which give rise to twist frequency differences of 10, 11 and 21. Had the twist frequencies 50, 40, and 30 been assigned, the twist frequency differences would have been 10, 10 and 20. Systematic as opposed to randomized differences in twist frequency have proved to perform poorly.

For the cable of this invention, it has been found that the twist length for each conductor pair should not exceed the product of about forty and the outer diameter of the insulation of one of the conductors of the pair. As should be apparent to one skilled in the art, this is a relatively short twist length.

Advantageously, the short pair twists of the conductor pairs of this invention reduce crosstalk (1) by reducing the distortion of the ideal helix of a pair of a given twist frequency when it is pressued next to a pair with a different twist frequency, and (2) by reducing "pair invasion" which is the physical interlocking of a conductor of one pair with an adjacent pair thereby increasing the physical separation between pairs.

Twist distortion must be considered and must be reduced to reduce crosstalk. Ideally, a conductor pair that has four twists per foot would forever be a perfect helix having four turns per foot and, if the electromagnetic field alongside this pair were sensed, a sine wave having four cycles per foot would be detected. But when conductor pairs having customary twist lengths are assembled into a core, one pair distorts the other. For instance, if a conductor pair with three twists per foot which is adjacent to one with four twists per foot is examined, spectral components associated with four twists per foot are observed, and, to the extent that they exist, crosstalk is produced as if the adjacent pairs both had four twists per foot. The relatively short twists of this invention resist this type of distortion.

Pair invasion also is an important consideration. The plurality of conductor pairs in the cable of this invention require more cross sectional space than cables made in the past for exchange use in telephone communications. In the prior art, seemingly it was most desirable to cause adjacent pairs to mesh together to increase the density or the number of pairs in as little an area as possible. The relatively short twist lengths and the method by which the plurality of conductor pairs are gathered together to form the core 45 minimizes the opportunity for a conductor of one pair to interlock physically with a conductor of an adjacent pair.

Figure 5:
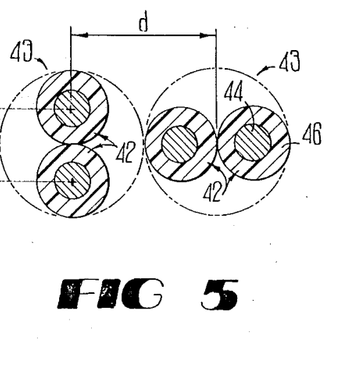
FIG. 5 is a schematic view of two pairs of insulated conductors as they appear in a cable of this invention.
Figure 7:
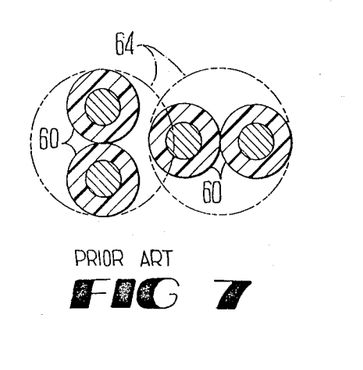
FIG. 7 is a schematic view of a pair of insulated conductors in a prior art arrangement.

In order to understand the packing parameter and its effect on crosstalk, attention is directed now to FIGS. 5 and 7 in each of which there is shown a schematic view of two pairs of insulated conductors. The conductors in FIG. 5 have already been referred to hereinbefore and are designated by the numerals 42—42 whereas the conductors shown in FIG. 7 depict a prior art arrangement and are designated 60—60. The conductors of each pair are spaced apart a distance "a" and the centers of the pairs spaced apart a distance "d" equal to twice the distance "a". The crosstalk between pairs is proportional to the quantity $a^2/d^2$. Accordingly, the greater the distance "d" between the centers of the conductor pairs, the less the crosstalk.

As can be seen in FIG. 7 which represents some pair prior art cables, it is commonplace in packed cores for at least one individually insulated conductor 60 of one pair to invade the space of another pair as defined by a circumscribing circle 64. On the other hand, compare FIG. 5 in which neither conductor 42 of one pair invades the circle-circumscribed space of another pair. On the average, along the length of conductor pairs associated together in the cable 20, the centers of the pairs will be spaced apart the distance "d". This results in reduced crosstalk.

If a pair of conductors is confined in a metallic shield, the capacitance increases, there is not space sharing, and, as in coaxial cable, the transmission loss is higher. The shield is effective in terminating the field that otherwise would extend out from the conductors into the shared space. As such, the shield is very effective in retaining all the electromagnetic energy inside its periphery, but the transmission loss increase. Although there is less crosstalk with a shielded pair, the signal attenuation is much greater. As should be apparent, the conductor pairs in FIG. 5, which are not individually shielded, share the electromagnetic space therebetween, but not the physical space of each pair as defined by the circumscribing circles.

The short twist length and the method of gathering together the conductor pairs effectively reduces pair meshing and causes each conductor pair to behave as though disposed in and to remain in a cylinder having a diameter of twice the outer diameter of an insulated conductor. Although the pairs of the cable have shared space insofar as electromagnetic fields are concerned, there is little, if any, sharing of the physical spaces defined by the circumscribing circles. As a result, the transmission loss between pairs is maintained at a low level and crosstalk between pairs is acceptable.

The absence of individual pair shielding overcomes another objection to prior art cables. The outer diameter of the insulation cover 46 about each metallic conductor is small enough so that the insulated conductor can be terminated with standard connector hardware.

The cable of this invention also is advantageous from the standpoint of the number of colors required for identifying the conductors. Generally, with the larger twist lengths customary in the art, when the sheath system is removed from an end portion of a cable, conductors of the twisted pairs intermix. For example, a white colored conductor of a blue-white pair may mix with a green conductor of a green-white pair. As a result, a larger number of color combinations must be used and hence inventoried to insure that proper identificaton can be made upon removal of a portion of the sheath system. Longer twist pairs are subject to untwisting at splices which can result in a type of splicing error called split pairs in which a wire of one pair is mistaken for that of another pair and two pairs thereby become useless.

On the other hand, with the cable of this invention, the short twist lengths cause the twist to be maintained in the pairs even after the sheath system is removed. As a result, the number of colors that need be used is reduced significantly.

Figure 8:
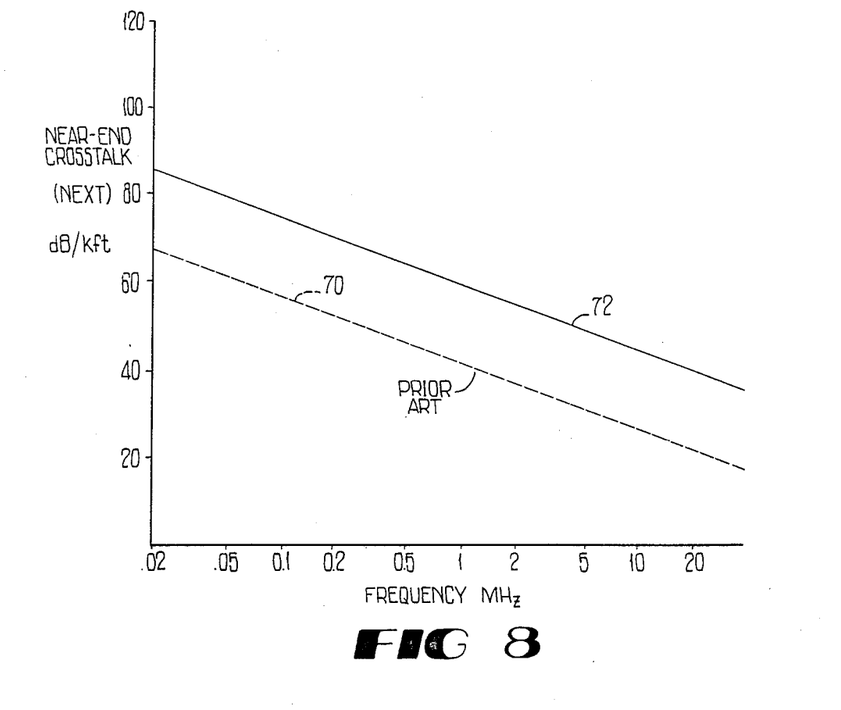
FIG. 8 is a graph which depicts the relationship of near-end crosstalk versus frequency for a cable of the prior art and of a cable of this invention.

It has been found that the losses experienced with the above-described cable are less than those for a cable having individually shielded pairs. Because the electromagnetic fields of the conductor pairs of the cable share space therebetween, the transmission losses are lower than if the conductor pairs were shielded individually. The crosstalk performance of the cable 20 is achieved because of a relatively short twist length for the conductor pairs in cooperation with the loose packing of the conductor pairs. Whereas the minimum power sum near end crosstalk in dB/Kft for four-pair DIW can be expressed as 41−15 log f where f is frequency in megahertz, that for the cable of this invention is 60−15 log f which is a 19 dB improvement. This 19 dB improvement is depicted in FIG. 8, wherein a line designated by the numeral 70 shows for a prior art cable the relationship between near-end crosstalk (NEXT) and frequency. A line designated by the numeral 72 depicts that same relationship for a cable of this invention.

EXAMPLE 1

Figure 9:
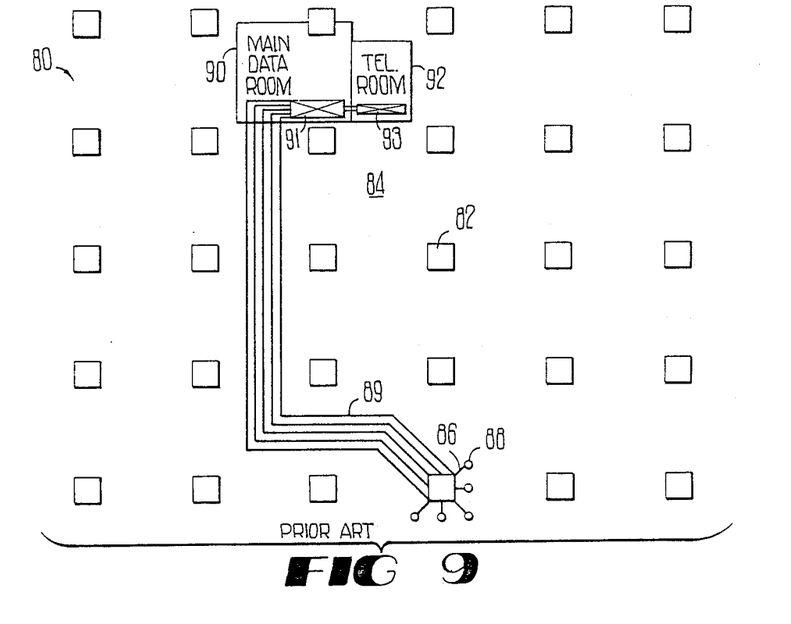
FIG. 9 is a schematic view of a prior art data cabling layout.

In one prior art premises distribution system 80 (see FIG. 9), twenty 88—88 workstations were associated with each of forty columns 82—82 of a building floor 84. Two four-pair DIW cables 86—86 extended to each workstation 88 so that a cabling arrangement 89 to each column included forty, four-pair DIW type cables for a total of 160 conductor pairs. Of these, only about 120 were usable because the crosstalk among the pairs in a four-pair DIW cable is so great that only two of the four pairs can be used for high speed data transmission. The cabling arrangement 89 is routed to a computer room 90 where a cross-connect facility 91 allows connection to a panel 93 in a telephone room 92. The cost of four pair DIW cables is relatively low, but because of the number of separate cables to each column, the installation costs become excessive.

Figure 10:
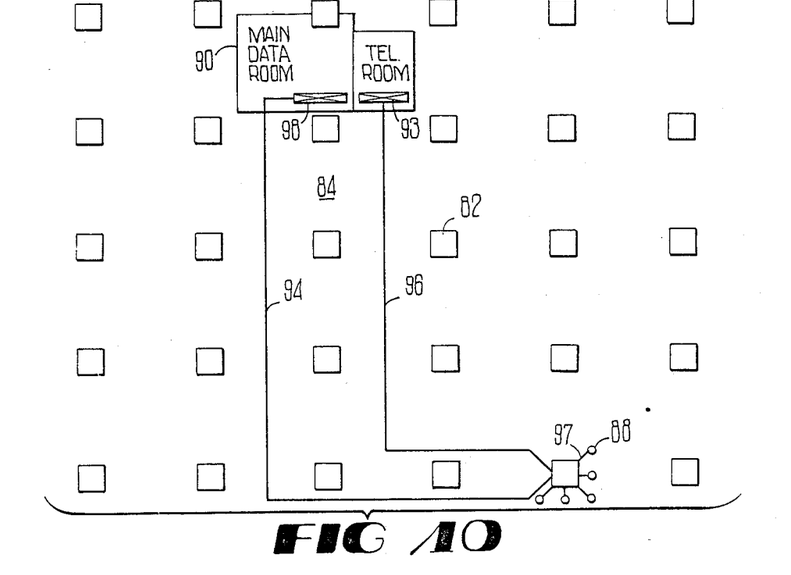
FIG. 10 is a schematic view of a data arrangement which includes a cable of this invention.

With the cabling arrangement of this invention, each column 82 is served by one data feeder cable 94 (see FIG. 10) which may include as many as about forty pairs of insulated conductors and by one telephone feeder cable 96. The data feeder cable 94 is manufactured in accordance with this invention. From the data feeder cable 94 and the telephone feeder cable 96 to each workstation 88 extends a cable 97 which include six pairs, two belted data pairs and four telephone pairs. As a result, installation costs are greatly reduced and a more compact cabling arrangement is achieved. The cornerstone of the arrangement in FIG. 10 is the cable 94 which may include as many as fifty conductor pairs, all of which pairs are usable for high speed data transmission because of the reduced crosstalk achieved by this invention. Also, as a result of this cabling arrangement, a small connection panel 98 in the data room 90 may be used.

EXAMPLE 2

In FIG. 11, there is shown a trough 100 in which are disposed three pairs of conductors being designated 102, 104 and 106, and having different twist frequencies.

It should be understood that the above-described arrangements are simply illustrative of the invention. Other arrangements may be devised by those skilled in the art which will embody the principles of the invention and fall within the scope and spirit thereof.

What is claimed is:

1. A cabling media which is suitable for balanced mode transmission with relatively low crosstalk, said cabling media comprising:
   a first pair of conductors; and
   at least two other pairs of conductors being adjacent to said first pair, each pair including two plastic-insulated metallic conductors which are twisted together in accordance with a twist frequency spacing such that increments of the twist frequency spacing as between adjacent pairs are non-uniform and such that the twist length of each pair does not exceed the product of about forty and the outer diameter of an insulated conductor of said each pair.

2. The media of claim 1, wherein said first pair and said at least two other pairs of insulated metallic conductors are disposed together in a trough.

3. A cable which is suitable for data transmission with relatively low crosstalk, said cable including:
   a plurality of pairs of conductors, each of said pairs including two individually plastic-insulated metallic conductors which are twisted together in accordance with a twist frequency spacing among adjacent pair twists such that the twist length of each pair does not exceed the product of about forty and the outer diameter of one of the insulated conductors of said each pair, said twist frequency spacing being modulated with some degree of randomization such that the increments of frequency spacing as among adjacent pair twists are non-uniform; and
   a jacket which is made of a plastic material and which encloses the plurality of pairs of plastic insulated metallic conductors.

4. The cable of claim 3, wherein each of said individually insulated conductors is insulated with dual layers of insulation comprising an inner layer of cellular insulation and an outer layer of a solid insulation.

5. The cable of claim 3, wherein each insulated conductor includes a metallic portion enclosed in an insulation cover and the insulation cover of each said conductor is relatively thin.

6. The cable of claim 3, wherein the conductor pairs are packed loosely in a core to minimize pair meshing.

7. The cable of claim 6, wherein the pairs are assembled together such that each pair is disposed in a circle having a diameter equal to twice the outer diameter of an insulated conductor and such that the circle which circumscribes the cross-sectional areas of the conductors of each pair is substantially uninterrupted by the circumscribed circle of any adjacent pair.

8. The cable of claim 3, wherein said jacket comprises a polyvinyl chloride plastic material.

9. The cable of claim 3, wherein the material with which each of the conductors is insulated and the material of the jacket is a fluoropolymer material.

10. The cable of claim 3, wherein said jacket is an outer jacket and said cable also includes an inner jacket which is made of a plastic material, and a shield.

11. The cable of claim 10, wherein the thickness of the inner jacket is equal to the product of about 0.167 to 1 and the outer diameter of the insulation of one of the conductors.

* * * * *